Oct. 17, 1933.  L. R. CLAUSEN  1,930,643
COMBINATION HARVESTER-THRESHER
Original Filed June 8, 1926   2 Sheets-Sheet 1
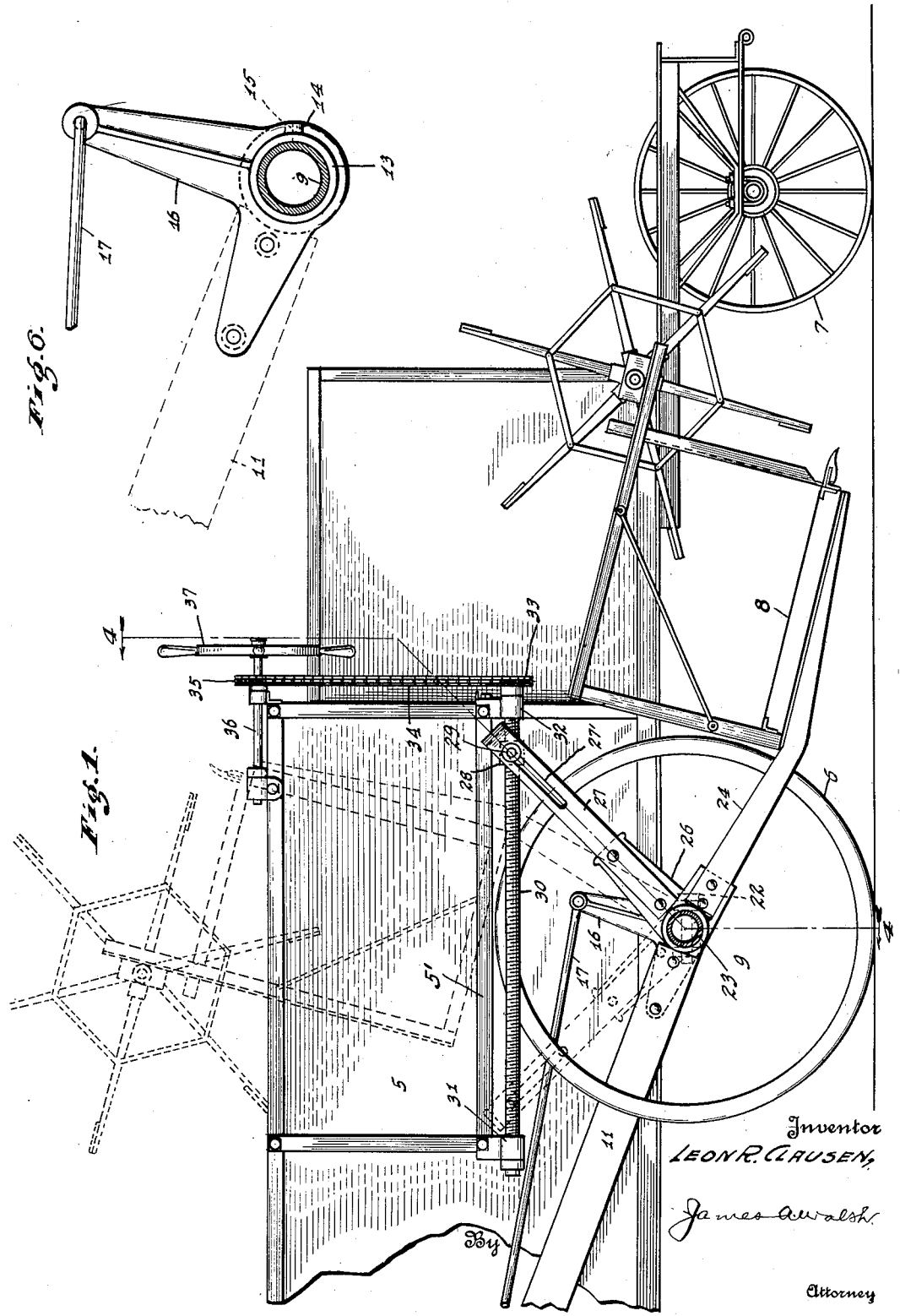

Oct. 17, 1933.  L. R. CLAUSEN  1,930,643
COMBINATION HARVESTER-THRESHER
Original Filed June 8, 1926  2 Sheets-Sheet 2
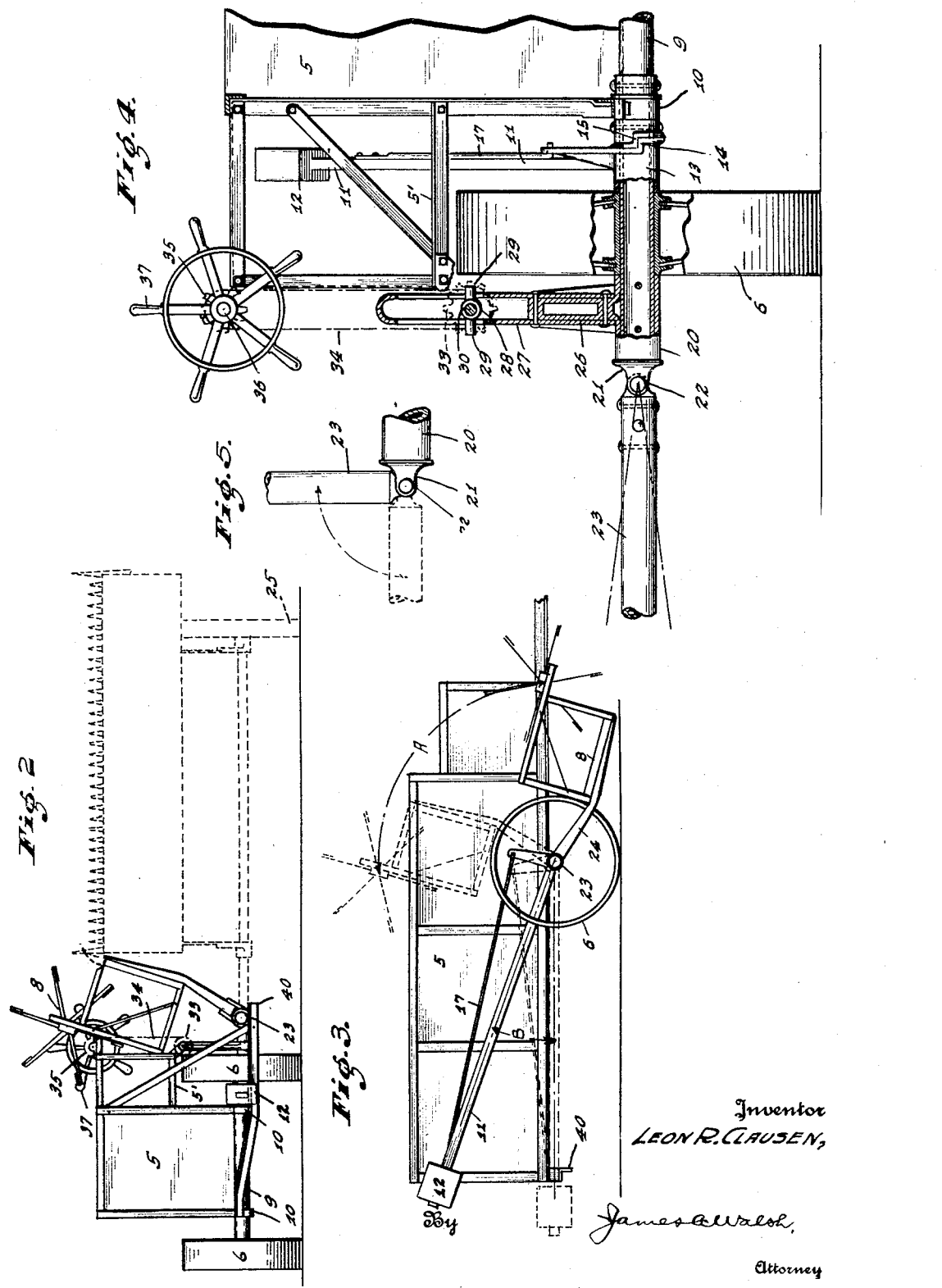

Patented Oct. 17, 1933

1,930,643

UNITED STATES PATENT OFFICE 1,930,643

COMBINATION HARVESTER-THRESHER

Leon R. Clausen, Racine, Wis., assignor to J. I. Case Company, Racine, Wis., a corporation Application June 8, 1926, Serial No. 114,479
Renewed June 24, 1933

22 Claims. (Cl. 56—20)

My present invention relates to that type of combination harvester-threshers in which provision is made for folding the harvester alongside the thresher to materially reduce the width of the machine in entirety so that it may be moved through or over comparatively narrow passageways, such as gates, bridges and the like, and conveniently stored; my object being to provide improved means for accomplishing such folding and unfolding, and also means for counterbalancing the offset weight of the harvester during its vertical adjustment in field operations, all as will be hereinafter more fully described.

In the accompanying drawings, forming part hereof, Figure 1 is a side elevation of a thresher and harvester embodying my improvements, the thresher and certain parts associated therewith being shown in fragment; Fig. 2 a rear elevation of the thresher showing the harvester in dotted lines in edgewise position and in full lines in folded relation to the thresher; Fig. 3 a side elevation of the machine with parts removed to more clearly indicate the range of movements of the harvester and counterbalancing mechanism; Fig. 4 a transverse sectional view taken on the dotted line 4—4 in Fig. 1; Fig. 5 a fragmentary detail of the thresher and harvester coupling which I employ; and Fig. 6 is a detail of a portion of the counterbalancing mechanism.

In said drawings the portions marked 5 indicate the thresher, 6 and 7 the usual carrying wheels therefor, and 8 the harvester, which parts may be of any desired construction and arrangement. The axle, 9, mounted in the carrying wheels 6 is rotatable therein and in the thresher supporting brackets, 10. Upon said axle 9 I mount counterbalancing mechanism preferably having an arm 11, with a weight 12 at its end, and which counterbalancing mechanism is disposed between the thresher frame and wheel 6, thus providing a compact assemblage of said parts and protecting the weighted arm from contact with other portions of the machinery beyond the wheel or interfering with the folding of the harvester. The arm 11 is connected to a rocking collar, 13, mounted on axle 9, said collar embodying a jaw clutch, 14, and adapted to engage and disengage a similar clutch, 15, secured to axle 9, a bracket, 16, extending from collar 13 to which is secured a rod, 17, which at its opposite end is connected to arm 11 and thus bracing said arm to its bearing.

Upon the outer end of axle 9 I secure a coupling member, 20, terminating in a yoke, 21, to which is connected by a horizontally disposed pin, 22, the axle or support, 23, for the harvester 8, which is secured thereto by the forwardly projecting supporting members, 24, the outer end of said axle being preferably carried by a caster or other supporting wheel, 25. Coupling member 20 comprises an arm, 26, to which I secure a follower, 27, having a slot or slots 27' therein within which a nut, 28, is positioned, said nut having trunnions, 29, about which said slotted follower travels. Said nut 28 is carried by a screw shaft, 30, supported in bearings, 31, 32, secured to the frame of the thresher, and at its forward end said screw is provided with a sprocket, 33, connected by a chain, 34, to a sprocket, 35, on shaft, 36, the latter being provided with a hand-wheel, 37, within convenient reach of an operator on platform 5' extending from the thresher.

In field operations the combined thresher and harvester are substantialy in the position indicated by the full lines in Fig. 1, and, as it is frequently necessary to adjust the harvester to the height at which the grain is to be cut, this is accomplished by turning the hand-wheel 37, which latter, through the sprockets and chain described, rotates shaft 30 and causes the nut 28 carried thereon to travel along said screw, and, by its trunnion connection with follower 27, moves the latter in the same direction, so that as the adjustment of the harvester is made higher or lower such actions can be controlled by the turning of said hand-wheel. Upon the discontinuation of such turning the follower 27, because of its connection with the screw 30 as described, will remain in immovable position, and the harvester will thus be maintained in the predetermined positions to which it has been adjusted, so that in this manner I provide an extremely simple and positively operable control of its movements. While thus adjusting the harvester, the weight of which is offset from its support, such weight is counterbalanced by the weighted arm 11 as the harvester raises and lowers by reason of the clutching engagement of the counterbalancing mechanism with axle 9, so that in manipulating hand-wheel 37 undue straining of the connections are avoided and the adjustments made but with slight effort by the operator.

In the employment of a combination harvester-thresher it is highly desirable that the machine should be capable of folding, that is, that the harvester element may be swung in a horizontal direction alongside the thresher in order that the machine may be materially reduced in width to be readily moved from field to field and through comparatively narrow passageways. I am enabled to so reduce the width of the machine by the adjusting devices described in a simple and expeditious manner. By turning the hand-wheel 37 in the proper direction the screw 30 and follower 27 become actuated to turn the axle 9 and harvester support 23, so that the latter will turn the harvester platform upwardly and transpose the same from the position shown in full lines to the edgewise position shown in dotted lines in Fig. 1, during which adjustment the harvester will describe a range of movement substantially as indicated by the line A in Fig. 3, while the weighted arm 11 follow the range substantially as shown at B in said Fig. 3 and become seated upon an arm or support 40 projecting from the thresher. The downward movement of the weighted arm is thus limited by said support, and, by the continued rotation of the hand-wheel 37, there being no fixed connection between the jaw clutches 14, 15, the axle will continue to turn until the harvester has been brought to its edgewise position as indicated in the drawings. During this operation, the pin 22 connecting the harvester and thresher, which pin is normally in horizontal position to permit the harvester to oscillate vertically when moving over ground inequalities, has been turned to vertical position as indicated in Fig. 5, permitting the harvester to be folded around this pivot from the position indicated in dotted lines to that shown in full lines in Fig. 2 to be in close proximity to the thresher, and whereby the width of the machine will be materially reduced for transportation or storage.

It will be understood, of course, that by swinging the harvester back to the dotted line position in Fig. 2 the same can be readily returned to normal cutting position by reversing the rotation of the hand-wheel and consequently the directions of the mechanisms communicating therewith and the harvester, and when the harvester has been so lowered to the point where the jaw clutches 14, 15, again come into engagement, the weighted arm 11 will perform its function of counterbalancing the harvester as it is being frequently adjusted to the height of cut in field operations. It will be further understood, of course, that the torque action on the harvester support or axle 23, due to the weight of the harvester, becomes greater as the latter is lowered and that the counterbalancing mechanism is quite essential for its control, but that when it is desired to fold the harvester the torque action on said harvester support is lessened as the harvester approaches its vertical or edgewise position, and during the latter adjustment the weighted counterbalancing arm is not so necessary; in other words, the adjustments of the harvester for cutting operations are made repeatedly to meet the varying heights of grain as the machine travels through the field, but adjustment to the edgewise position beyond the range of action of the weighted arm is necessary only at infrequent intervals for folding the machine, and which adjustment is readily accomplished by the screw shaft and its connections, which form powerful means for raising the harvester platform during its unbalanced period, and in addition to which said screw-shaft is self-locking and thus of advantage during the varied ranges of working adjustments of the harvester.

I claim as my invention:

1. In a machine of the class described, a harvester, a thresher, a rotatable axle supporting said thresher, a support for said harvester, a flexible coupling connecting said axle and support to permit vertical and horizontal movements of said harvester, a counterbalancing member rockingly mounted on said axle, means for engaging and disengaging said counterbalancing member, and means connected to said axle for rotating the same and said harvester support to transpose said harvester from cutting to edgewise position.

2. In a machine of the class described, a harvester, a thresher, means for coupling said elements, counterbalancing mechanism on said coupling means, a follower mounted on said coupling means, a screw shaft, means connecting said follower and screw-shaft, and means for rotating said screw-shaft and actuating said follower to rock said coupling means for transposing said harvester from horizontal to edgewise positions.

3. In a machine of the class described, a harvester, a thresher, means for coupling said elements, a follower mounted on said coupling means, a screw, means connecting said follower and screw, and means for rotating said screw and actuating said follower to rock said coupling means for transposing said harvester from horizontal to edgewise position.

4. In a machine of the class described, a harvester, a thresher having a supporting wheel, an axle supporting said thresher, counterbalancing mechanism mounted on said axle between the thresher and wheel, harvester supporting means connected to said axle, and means on said axle for rocking said harvester-supporting means to transpose said harvester from horizontal to edgewise positions.

5. In a machine of the class described, a harvester, a thresher, flexible means connecting said elements, means for rocking said connecting means comprising a pivotally mounted follower, a screw-shaft upon which said follower is mounted, and means for rotating said screw-shaft to actuate said follower to travel therealong and rotate said connecting means for raising and lowering said harvester.

6. In a machine of the class described, a harvester, a thresher, a continuous axle supporting said thresher and harvester, a collar on said axle, a follower connected to said axle, a screw-shaft, a nut trunnioned in said follower and mounted on said shaft, and means for actuating said screw-shaft to move said nut therealong to impart rocking motion to said follower for turning said axle and transposing said harvester from vertical to edgewise positions.

7. In a machine of the class described, a harvester, a thresher, an axle supported on said thresher, a clutch member on said axle, counterbalancing mechanism embodying a clutch adapted to engage said clutch member, a harvester support connected to said axle, and means for rocking said axle and support to adjust said harvester.

8. In a machine of the class described, a thresher, an axle mounted thereon, a carrying wheel on said axle, counterbalancing mechanism mounted on said axle between said thresher and said wheel, a harvester connected to said thresher, and means on said thresher for adjusting said harvester to the height of cut in field operations.

9. In a machine of the class described, a thresher, an axle secured thereto, a clutch member on said axle, counterbalancing mechanism mounted on said axle embodying a clutch member adapted to engage said first mentioned clutch member, a harvester connected to said axle, and means on said axle for turning the same to adjust said harvester and to engage and disengage said clutch members.

10. In a machine of the class described, a thresher, a follower supported at one end by said thresher, a screw shaft on the thresher connecting the opposite end of said follower, a harvester connected to said thresher, and means for rotating said screw-shaft to actuate said follower for raising and lowering said harvester.

11. In a machine of the class described, a thresher, a rotatable axle secured thereto, a clutch member on the axle counterbalancing mechanism pivotally mounted on said axle and embodying a clutch-jaw adapted to engage and disengage said member, a harvester connected to said thresher, means on said thresher for adjusting the harvester vertically, and means for manually actuating said adjusting means.

12. In a machine of the class described, a thresher, a rotatable axle secured thereto, a wheel on said axle, counterbalancing mechanism on said axle between said thresher and its wheel, a harvester connected to said thresher, and means on said axle for rotating the latter and adjusting said harvester.

13. In a machine of the class described, a thresher, a harvester, a rotatable axle on said thresher, a support upon which said harvester is mounted, flexible means connecting said support and said axle whereby said harvester may move vertically over ground irregularities, means connected to said axle for rotating the same and said harvester support, a screw-shaft upon which said connecting means is adjustably mounted, and mechanism for rotating said screw-shaft to actuate said connecting means to turn said axle and harvester-support for transposing said harvester from cutting to edgewise and folding positions.

14. In a machine of the class described, a thresher, a harvester, a screw-shaft on said thresher, a trunnioned nut on said shaft, a slotted follower mounted at one end on the thresher and connected at its opposite end to said nut, a harvester connected to said follower, and means on said thresher for rotating said screw-shaft and rocking said follower to vertically adjust said harvester.

15. In a machine of the class described, a thresher, a harvester, a continuous rotatable axle for supporting said elements, counterbalancing mechanism rockingly mounted on said axle, and means on said axle for controlling the range of movement of said mechanism.

16. In a machine of the class described, a thresher, a harvester, a continuous rotatable axle for supporting said elements, counterbalancing mechanism rockingly mounted on said axle, and means on said axle for controlling the range of movement of said mechanism, harvester adjusting mechanism fixedly connected to said axle, and means for actuating said mechanism to rock said axle independently of said counterbalancing mechanism for adjusting said harvester to the height of cut and for transposing said harvester to edgewise and folding position.

17. In a machine of the class described, a thresher, an axle therefor, means connecting said axle to said thresher whereby the axle may be turned, counterbalancing mechanism rockingly mounted on said turnable axle, a coupling secured to said axle, a rocking member secured to said coupling, and means on said thresher engaging said rocking member to actuate the latter for turning said axle.

18. In a machine of the class described, a thresher, a harvester, means for connecting said harvester to said thresher, a rocking member connected to said connecting means, actuating means connected to said rocking member, and means embodying a sprocket-and-chain system secured to and operating said actuating means to move said rocking member therealong and turn said connecting means for adjusting said harvester to the height of cut and for transposing the latter to edgewise and folding positions.

19. In a machine of the class described, a harvester, a thresher, counterbalancing mechanism for said harvester mounted on said thresher, a clutch adapted to engage and disengage said mechanism, a harvester support connected to said thresher, and means for rocking said support to adjust said harvester.

20. In a machine of the class described, a thresher, a harvester, means for flexibly connecting said harvester to said thresher, counterbalancing means for said harvester mounted on said thresher, and clutch members for engaging and disengaging said counterbalancing means to counteract the offset weight of said harvester and whereby the latter may be adjusted from horizontal to edgewise position.

21. In a machine of the class described, a thresher, an axle, a wheel on the axle for supporting the thresher, a harvester connected to the thresher, and mechanism mounted upon the axle between the thresher and wheel for counterbalancing the offset weight of the harvester while being adjusted.

22. In a machine of the class described, a thresher, a supporting wheel for the thresher, counterbalancing mechanism positioned between the thresher and wheel, a harvester flexibly connected to the thresher, and means on the thresher and connected to the harvester for adjusting the latter so that said mechanism will counterbalance the weight of the harvester while the latter is being adjusted

LEON R. CLAUSEN.